US011573329B2

(12) United States Patent
Arditi

(10) Patent No.: US 11,573,329 B2
(45) Date of Patent: Feb. 7, 2023

(54) MODELING EFFECTS OF STRUCTURES ON GLOBAL-POSITIONING SYSTEM LOCALIZATION

(71) Applicant: Lyft, Inc., San Francisco, CA (US)

(72) Inventor: Gil Arditi, Palo Alto, CA (US)

(73) Assignee: Lyft, Inc., San Francisco, CA (US)

( * ) Notice: Subject to any disclaimer, the term of this patent is extended or adjusted under 35 U.S.C. 154(b) by 857 days.

(21) Appl. No.: 16/368,701

(22) Filed: Mar. 28, 2019

(65) Prior Publication Data

US 2020/0309960 A1  Oct. 1, 2020

(51) Int. Cl.
*G01S 19/40* (2010.01)
*G01S 19/45* (2010.01)
*G01S 19/10* (2010.01)

(52) U.S. Cl.
CPC .............. *G01S 19/10* (2013.01); *G01S 19/45* (2013.01)

(58) Field of Classification Search
CPC .......... G01S 19/40; G01S 19/45; G01S 19/01; G01S 19/07; G01S 19/39; G01S 19/42; G01S 19/00
See application file for complete search history.

(56) References Cited

U.S. PATENT DOCUMENTS

| 5,774,831 A * | 6/1998 | Gupta ..................... G01S 19/40 701/481 |
| 2006/0147088 A1* | 7/2006 | Han ...................... G05D 1/0278 701/472 |
| 2014/0266873 A1* | 9/2014 | Pighin ..................... G01S 19/40 342/357.42 |
| 2016/0258759 A1* | 9/2016 | Matthews ............ G05D 1/0274 |

* cited by examiner

*Primary Examiner* — Jeff A Burke
*Assistant Examiner* — Christopher A Buksa
(74) *Attorney, Agent, or Firm* — Baker Botts L.L.P.

(57) ABSTRACT

In one embodiment, a method includes accessing global positioning system (GPS) data indicating a raw location associated with the computing system; accessing, based on the raw location, environmental model data including one or more structures; generating GPS correction data by processing the GPS data and the environmental model data using a machine-learning (ML) model that has been trained to compensate inaccurate GPS readings due to environmental interference; and determining an accurate location by correcting the raw location using the GPS correction data.

20 Claims, 8 Drawing Sheets

MODELING EFFECTS OF STRUCTURES ON GLOBAL-POSITIONING SYSTEM LOCALIZATION

BACKGROUND

The global-positioning system (GPS) is a system that provides users positioning, navigation, and timing (PNT) services. UPS uses a constellation of satellites transmitting one-way radio signals to a GPS receiver device of a user. The satellites in the GPS constellation are arranged in equally-spaced orbital planes surrounding the Earth. Each plane contains four "slots" occupied by GPS satellites. This arrangement theoretically provides GPS receiver devices access to at least four GPS satellites from virtually any point on the ground. GPS satellites broadcast radio signals providing their location, status, and time from on-board atomic clocks. A GPS receiver device receives the radio signals, noting the time of the GPS signals are received, and uses these times to calculate the distance from the GPS satellites. The distance calculation is based on the difference between the time the GPS signal is transmitted by the GPS satellite and the time the signal is received by the GPS receiver device. Once a GPS receiver device knows the distance between the receiver device and at least four satellites, the location of the GPS receiver device may be determined in three dimensions.

As described in more detail above, determining the location of a GPS receiver device is dependent on determining the distance between the GPS receiver and the GPS satellites providing the GPS signals. Determining the distance, in turn, depends on accurately determining the time between the GPS satellite transmitting the signal and when the signal is received by the GPS receiver device. Any unaccounted changes in this travel time may lead to inaccurate GPS localization. As an example and not by way of limitation, reflections of GPS signals off of tall structures may delay reception of the GPS signals by the GPS receiver device, as compared to the GPS signals being received directly by the GPS satellites. This unaccounted delay in the time may provide a location that is in a different block or hundreds of yards away from the actual location of the GPS receiver device.

A number of applications are dependent on accurate location information. As an example and not by way of limitation, reliable navigation is dependent on having an accurate location determination. For example, a navigation system of a vehicle would need to know how to navigate to the destination based on its current location. Having an inaccurate location reading may lead to a vehicle missing a turn or having a collision with an obstacle. As another example, automated farm equipment used for harvesting crops may harvest an incorrect field if the farm equipment is provided with inaccurate location readings.

DESCRIPTION OF EXAMPLE EMBODIMENTS

Figure 1:
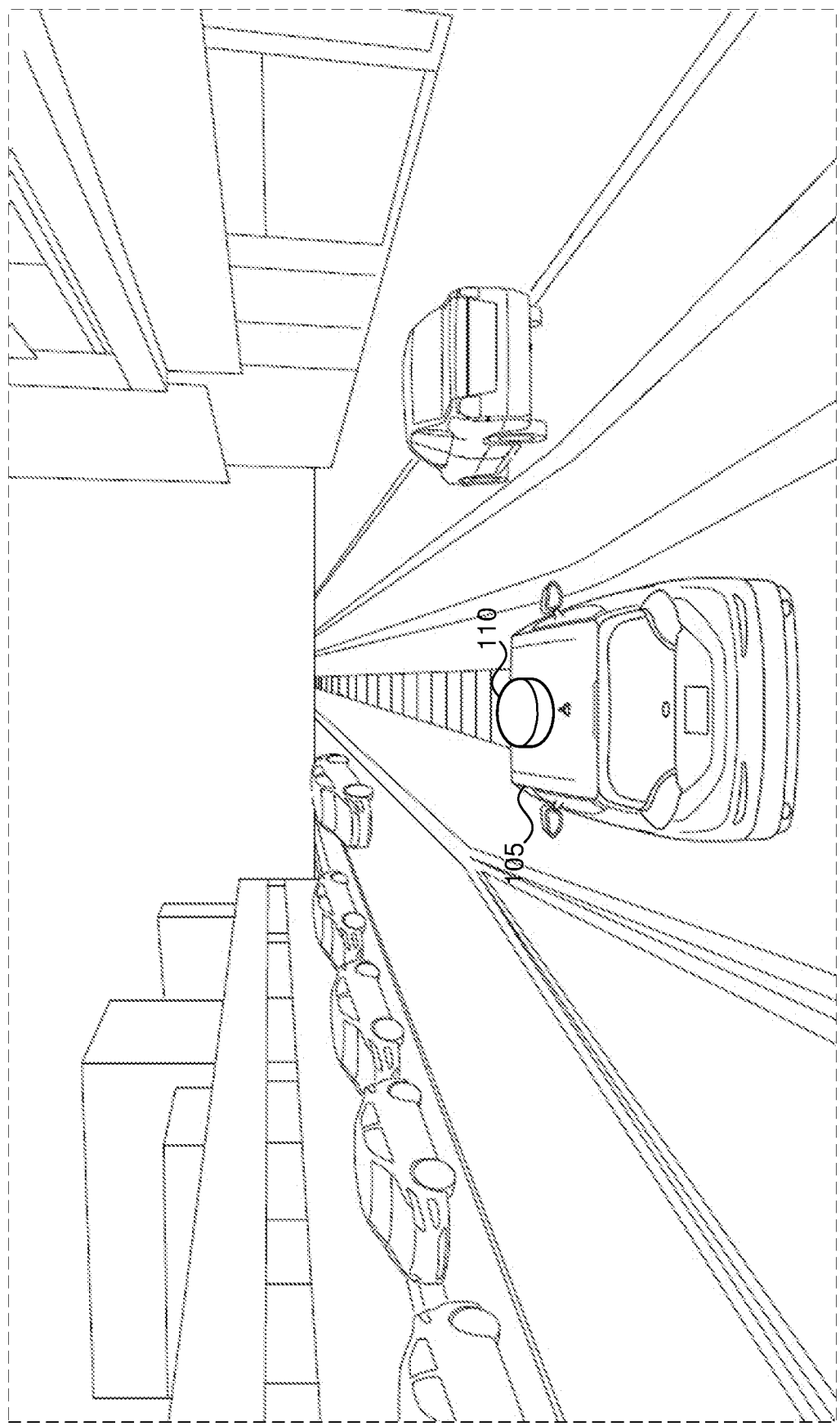
FIG. 1 illustrates a vehicle with a global-positioning system (GPS) unit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject matter described herein is generally directed to improving location determination in areas where the computing device determining the location does not have line-of-sight access to a number of GPS satellites (e.g., 4 GPS satellites), resulting in unreliable GPS signals, and in turn inaccurate GPS localization. This may be an issue that occurs in areas with a relatively high density of tall structures (e.g., buildings, mountains, hills, water towers, silos, or trees) causing an "urban canyon." As an example and not by way of limitation, based on uncorrected GPS data, a client device may be provided a raw location that is on a different block or hundreds of yards away from the actual or corrected location of the device providing the GPS data. More accurate GPS locations may be provided by determining the transformations affecting the GPS signal that is coming from GPS satellites to a client device for making corrections to the current location of the client device.

As described in more detail above, determining the location of a GPS receiver device is dependent on accurately determining the time between the GPS satellite transmitting the signal and when the signal is received by the GPS receiver device. Any unaccounted changes in this travel time may lead to inaccurate GPS localization. There are many unaccounted factors that may cause the time of flight of the GPS signals to differ from the line-of-sight assumption used to determine the distance between the GPS receiver device and the GPS satellites. As an example and not by way of limitation, these factors may include the position of tall structures relative to the GPS receiver device and the GPS satellites, geometry of the structures, material of the structures, weather in the area of the GPS receiver device. A solution to accurately determine a location from GPS signals would comprehensively account for at least these factors.

The mathematical representations of the transformations of wave functions modeling the interactions of the GPS signals are complex. Furthermore, information of the material used to construct the buildings and other phenomena that would interfere or effect wave propagation in the atmosphere would need to be modeled. For example, the weather at the time GPS data is captured should be used to accurately model the effect of buildings on the GPS signals. In particular embodiments, instead of explicitly determining these transformations, a supervised machine-learning (ML) approach may be used. In particular embodiments, a ML model may be trained using data indicating the raw location of a client device and the actual location of the client device, and the ML model is trained to compensate for the difference in the raw location and actual location, as described in more detail below.

Embodiments described herein may benefit a variety of platforms, systems, or methods, especially those where accurate location determinations are important, by providing corrected location information to the platform or system. As an example and not by way of limitation, GPS navigation systems for vehicles with human drivers may give faulty navigation instructions based on inaccurate location determination. Similarly, pedestrians and cyclists use navigation systems within urban areas to navigate from their current location to an unfamiliar destination. As another example, unmanned aerial vehicles or drones are dependent on accurate GPS location determination to successfully navigate to a destination. As another example, automated harvesting equipment is dependent on accurate GPS location determination to determine the proper area of crops that are ready for harvesting. As an example and not by way of limitation, FIG. 1 illustrates an example vehicle with a GPS system. Vehicle 105 may be equipped with an on-board GPS navigation system that may be used to provide navigation instructions based on signals received from a number of GPS satellites. In particular embodiments, vehicle 105 may be an autonomous vehicle (AV) that uses HD maps to drive and navigate safely, so that the accuracy of the map and location determination of vehicle 105 accuracy is critical.

In particular embodiments, vehicle 105 may include a mounted sensor array 110. A fleet of vehicles 105 with a mounted sensor array 110 may drive to various locations and collect GPS satellite data, as well as other data for determining a location through other methods. In particular embodiments, vehicles 105 may determine their location using the received GPS signals, as described in more detail above. In particular embodiments, a non-GPS signal-based method of determining a location may be based on mapping the buildings around vehicle 105. This mapping may be performed using video images, still images, or LiDAR data of the environment surrounding vehicle 105 at any given moment and comparing the buildings to a building database. As described in more detail below, a non-GPS signal-based method for determining the location of vehicles 105 may be used as training data for a machine-learning GPS data correction.

Figure 2:
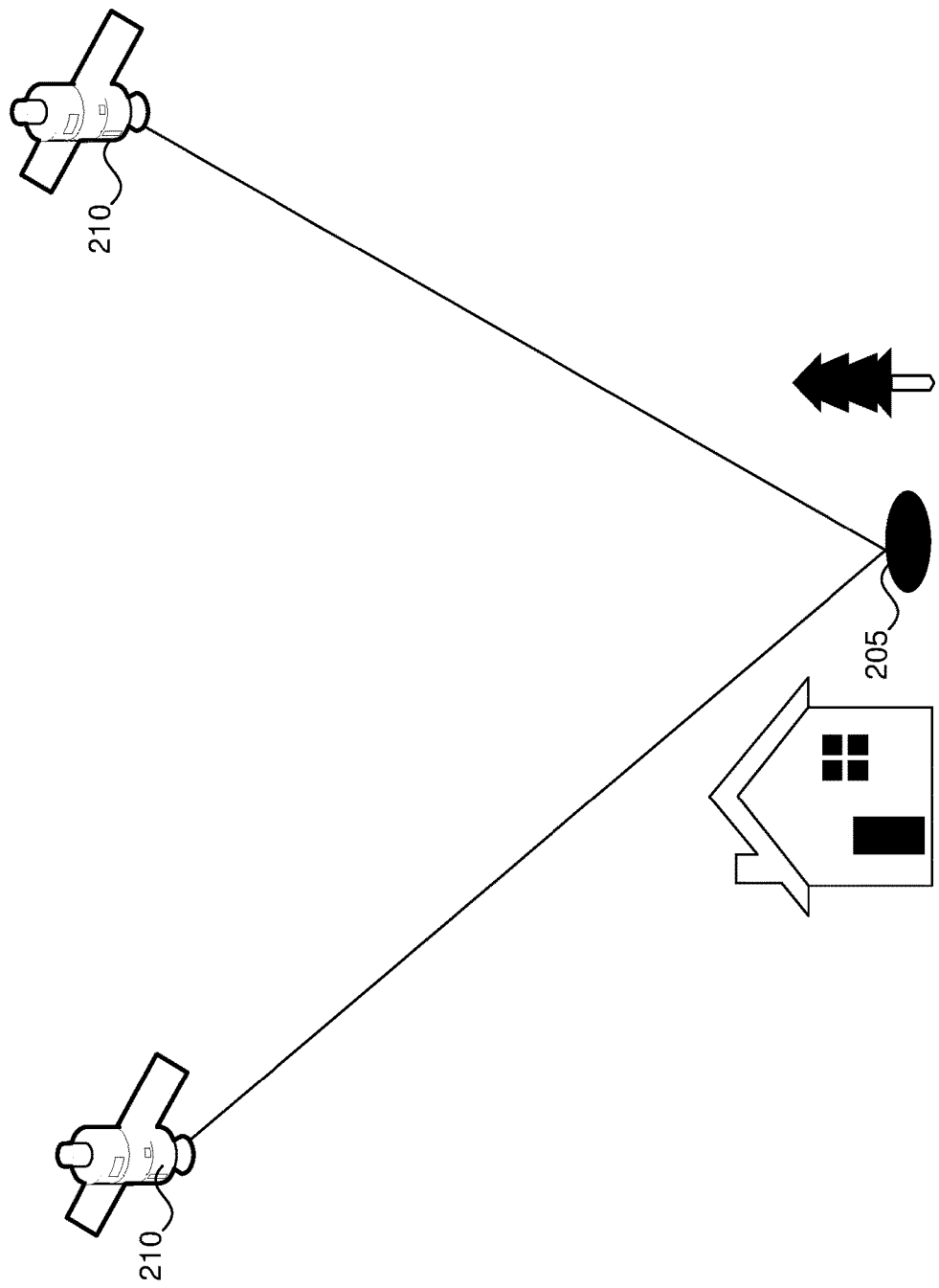
FIG. 2 illustrates a line-of-sight interaction between GPS satellites and a GPS unit.

FIG. 2 illustrates a line-of-sight interaction between GPS satellites and a GPS unit. In particular embodiments, a client device may be equipped with a GPS unit. GPS units are configured to receive signals from GPS satellites 210 that are orbiting the earth and, based on the GPS signals, determine a raw location 205 of the client device. GPS localization is based on time and the known position of GPS satellites 210. GPS satellites 210 are equipped with atomic clocks that are synchronized with each another and with the ground clocks. Similarly, GPS satellite 210 locations are known with great precision. Each UPS satellite 210 continuously transmits a radio signal containing the current time and data about its position. The time delay between when GPS satellite 210 transmits the GPS signal and the GPS unit receives it is proportional to the distance from each GPS satellite 210 to the GPS unit. A UPS unit monitors multiple GPS satellites 210 and determines raw location 205 of the receiver based on the respective time delay. When the GPS unit has an unobstructed line-of-sight path to GPS satellites 210, as illustrated in the example of FIG. 2, the time delay provides an accurate indication of raw location 205. As described in more detail below, an obstructed path between GPS satellites 210 and raw location 205 may lead to inaccurate GPS localization.

Figure 3:
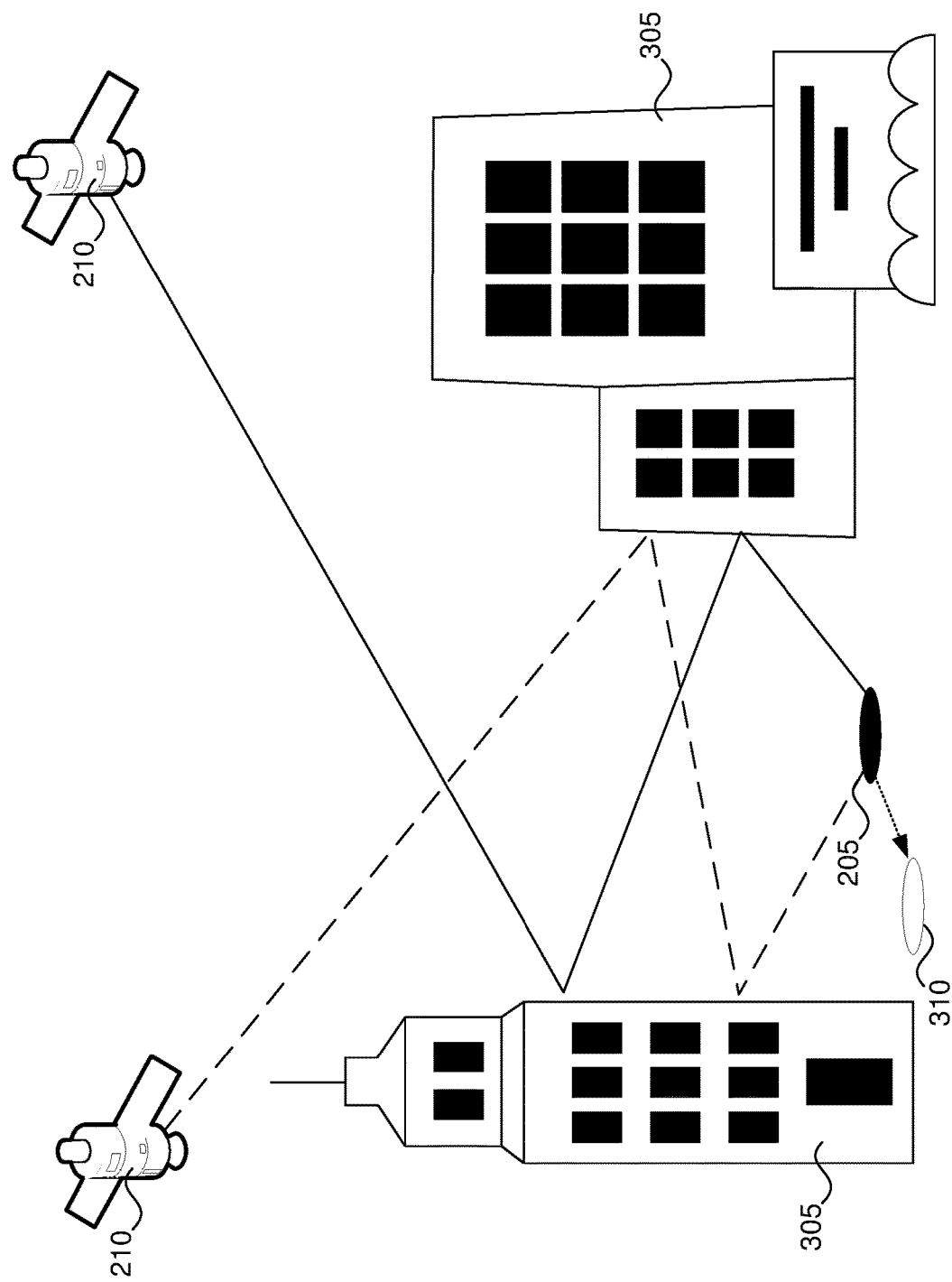
FIG. 3 illustrates an obstructed interaction between GPS satellites and a GPS unit.

FIG. 3 illustrates an obstructed interaction between GPS satellites and a GPS unit. In areas with a relatively high density of tall structures (e.g., buildings, mountains, or trees), the signals from GPS satellites 210 to the GPS unit may be reflected by one or more structures 305, as illustrated in the example of FIG. 3. In this scenario, the signals from GPS satellites 210 do not have the same time of flight as when the GPS unit has an unobscured line-of-sight path, illustrated in the example of FIG. 2. For this reason, a raw location 310 determined using these reflected signals may be some distance away from current or accurate location 205. Accurate GPS localization would take into account factors that affect GPS signal propagation, such as for example, the geometry and material properties of structures 305 in the proximity of the CRS receiver device. Other factors, such as for example, the weather or the position of the GPS receiver device to structures 305 may also be taken into account when correcting the GPS localization.

Figure 4:
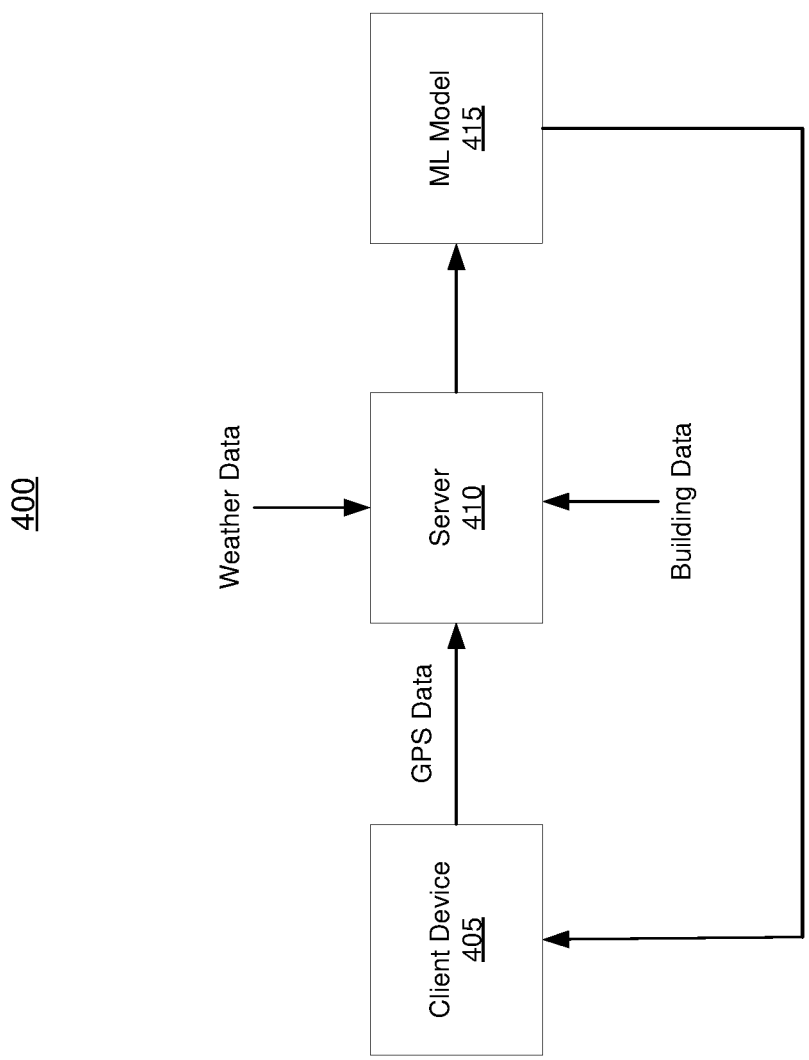
FIG. 4 illustrates an example network architecture for correcting GPS data.

FIG. 4 illustrates an example network architecture for correcting GPS data. Network architecture 400 may include a client device 405, a server 410 in communication with client device 405, and a ML model 415 that is trained or that has learned the relationship between those factors that could affect signal propagation and the amount of deviation in the time of flight of the GPS signal caused by these factors, as described in more detail below. Client device 405 may be a GPS receiver device that includes a GPS unit to monitor signals from GPS satellites for location determination. Data of the signals from the GPS satellites are sent to server 410. As described below in more detail, the data of the signals from the GPS satellites may include the time the GPS signal was transmitted by the respective GPS satellite. In particular embodiments, server 410 may determine the location of the GPS satellites sending the signals based on the timestamp of the signals. As an example and not by way of limitation, data provided to server 410 from client device 405 may include raw GPS signals or location data (e.g., longitude/latitude coordinates) computed by client device 405.

Server 410 may process the data of the signals from client device 405 to make a preliminary determination of the raw location of client device 405. In particular embodiments, server 410 may supplement ML model 415 with environmental model data, such as radial/3D/material data associated with nearby structures or transform the data from client device 405. As an example and not by way of limitation, secondary data may include environmental model data and weather data. Server 410 may access one or more databases to obtain the secondary data associated with the preliminary or raw location of client device 405. The environmental model data may be retrieved by accessing a HD map of the area around the preliminary or raw location and determine based on the HD map the buildings in the vicinity of the preliminary or raw location. Server 410 may then access data associated with these structures. In particular embodiments, the environmental model data may include a three-dimensional (3D) model of the structures in the vicinity of the raw location and data of the materials used to construct the structures (e.g., reflective or refractive properties, density, texture, or absorptivity). In particular embodiments, the 3D model of the structures may be converted to radial coordinates.

The GPS data, 3D model of the structures, and weather data may be sent to ML model 415 for correcting the GPS data. As an example and not by way of limitation, client device 405 may query a database of a third-party system to access the weather of the raw location. As described in more detail below, the corrected GPS data may then be sent to client device 405. Although this disclosure describes and illustrates particular computational architecture for correcting GPS data, this disclosure contemplates any suitable computational architecture for correcting GPS data. As an example and not by way of limitation, client device 405 may download ML model 415 from server 410 after ML model 415 has been trained. Client device 405 may determine its raw location and query server 410 for the secondary information, and then compute the GPS data correction locally using ML model 415.

Figure 5:
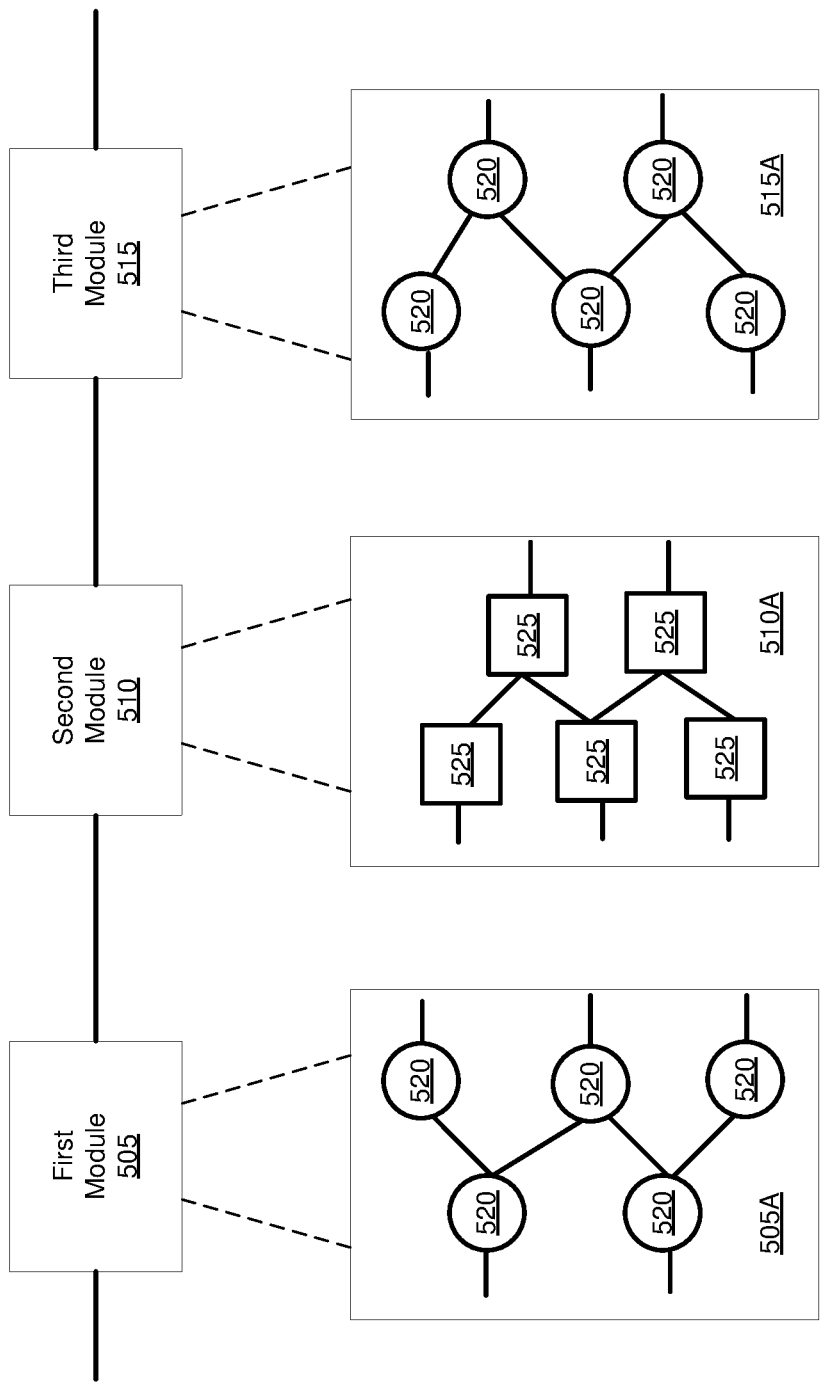
FIG. 5 illustrates an example machine-learning (ML) network architecture for correcting GPS data.

FIG. 5 illustrates an example ML model for correcting GPS data. In particular embodiments, ML model 415 may include one neuron layers in addition to preset computation modules representing wave propagation function components. Although this disclosure describes and illustrates a particular ML model, this disclosure contemplates any suitable ML model, such as for example fully connected layers of neural networks, convolutional neural networks, recurrent neural networks, recursive neural networks, unsupervised pretrained networks, and/or any combination thereof. ML model 415 includes a first module 505 with one or more neurons 520, a second module 510 with one or more computation modules 525, and a third module 515 that may include one or more neurons 520. In particular embodiments, as illustrated in FIG. 5, layer of neurons, a second module 510 that may include one or more layers of computation modules, and a third module 515 that may include one or more layers of neurons. As an example and not by way of limitation, an expanded view 505A illustrates that first module 505 may include a number of layers of neurons 520 where the output of one layer may be provided as the input to another layer of neurons 520. Similarly, an expanded view 515A illustrates that third module 505 may include a number of layers of neurons 520 where the output of one layer may be provided as the input to another layer of neurons 520. Each neuron 520 may compute a linear function and may be configured to pass information to other neurons. As described below in more detail, each neuron may independently adjust a weighting coefficient and bias coefficient of the linear function resulting different linear functions being applied at each connection between neurons 520, computation modules 525, or neurons 520 and computation modules 525.

As an example and not by way of limitation, an expanded view 510A illustrates that second module 510 may include a number of layers of computation modules 525 where the output of one layer may be provided as the input to another layer of computation modules 525. In particular embodiments, computation modules 525 of second module 510 may be configured to compute the propagation of the GPS signals using physics-based equations and there may be one or more computation modules 525 that may be tasked to perform the same or different computations. As an example and not by way of limitation, computation modules 525 may compute equations corresponding to a physics-based propagation trajectory the GPS signal from the satellite, amount of reflection of the GPS signal from a structure, or time delay of the GPS signal from the reflection from the structure. Solving these equations allows computation modules 525 to model highly complex wave-propagation functions that may represent the environmental effect that buildings, weather, and other external factors have on the signal received by the GPS receiver. In particular embodiments, computation modules 525 for calculating a propagation trajectory may be provided inputs corresponding to an angle of incident, building material, building geometry, height of GPS satellites above the ground, or any suitable input. An example output of a computation module for computing signal trajectory equations may be a vector representing the trajectory of the GPS signal from the structure. In particular embodiments, neurons 520 may not directly provide these actual inputs, since neurons 520 are trained to derive the data for computation modules 525 from based on data provided to neurons 520.

In particular embodiments, the equations of computation modules 525 may be considered equivalent to the functions that govern the propagation of the GPS signal once the signal impinges on a surface (e.g., of a structure). Some of the energy of the GPS signal is absorbed and some of it gets refracted. The equations of computation modules 525 may include coefficients of signal propagation, where the values of these coefficients are determined through training, as described below in more detail. The output of the computation modules may correspond to the return of the GPS signal from the surface, which would represent the signal strength of the reflected GPS signal. In particular embodiments, the weights of the coefficients may be trained using a backpropagation algorithm to minimize a specific cost function. In particular embodiments, the output of ML model 415 may be a delta or correction to the GPS signal strength used to determine the location of the client device.

Figure 6:
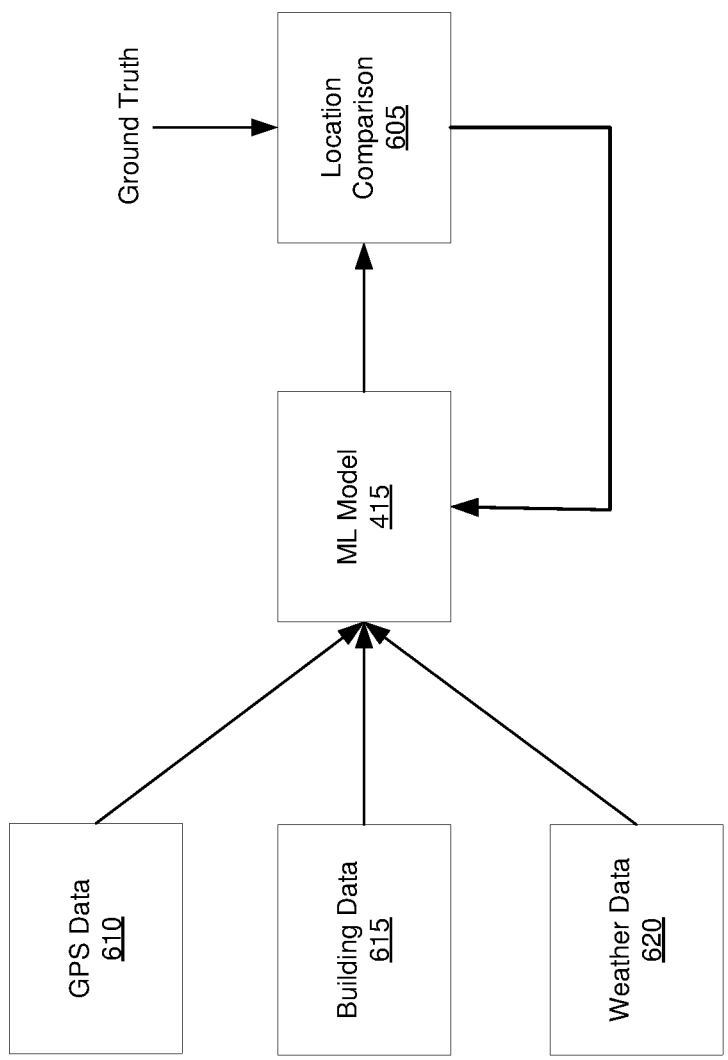
FIG. 6 illustrates an example ML-training diagram.

FIG. 6 illustrates an example an example ML-training diagram. ML model 415 may be trained to account for the 3D structures near the computing device and other factors that may affect GPS signals, such as environmental model data 615 (e.g., 3D representation and materials of structures) and weather data 620. In particular embodiments, training ML model 415 may involve receiving GPS data 610 measured by the client device of a large number of users and secondary information (e.g., environmental model data 615 and weather data 620). Environmental model data 615 and weather data 620 may be obtained by the server through a third-party database or from the client device providing the data (e.g., weather data 620). As an example and not by way of limitation, environmental model data 615 may include a 3D representation of the structures in proximity to the raw location of the client device and the 3D representation may be converted to radial coordinates. In particular embodiments, the input (e.g., GPS data 610) and output may be normalized to rescale the input and output values. As an example and not by way of limitation, the input or output of ML model 415 may be a value between 0 and 1.

ML model 415, described in more detail above, may be trained using any suitable training techniques, including using supervised machine learning to learn from labeled training data, unsupervised machine learning to learn from unlabeled training data, or semi-supervised machine learning to learn from both labeled and unlabeled training data. In particular embodiments, where supervised machine-learning is used to train ML model 415, the training data set may include a large number of training samples (e.g., thousands or millions) gathered from various sources (e.g., data-gathering vehicles with different sensor configurations or equipment). Each training sample may be associated with an instance of data captured at a particular location. As an example and not by way of limitation, at the raw location (e.g., coordinates (x, y), latitude/longitude positions, etc.), a data-gathering vehicle may gather the data for the training samples using its GPS system, camera, LiDAR, radar, sonar, and/or any other suitable sensors, as described in more detail below. As another example, a person walking may gather the data in the training sample using a portable GPS system, such as for example, a smartphone, and other data, such as for example, images of the area where GPS data 610 is captured. Although this disclosure describes capturing training samples using particular methods, this disclosure contemplates any suitable methods for capturing training samples, such as for example an automated robotic device equipped with GPS and other sensors (e.g., cameras or radar).

In particular embodiments, each training sample includes the collected GPS data 610, as well as the other secondary information of factors affecting propagation of the collected GPS signals. As described above in more detail, this secondary information may include environmental model data 615 and weather data 620 at the time and location where GPS data 610 was collected. In particular embodiments, the secondary information may be obtained based on the raw location determined using the collected GPS data 610, accessing a HD map corresponding to the raw location, and accessing one or more databases to find the weather of the raw location at the time of GPS data 610 measurement, as well as the 3D representation and building composition of the structures in the area of the raw location. A training sample may further be associated with a known, target output, which in particular embodiments may be GPS data 610 (e.g., signal-strength readings) at that particular location. In the context of training of ML model 415, the ground truth serves as the target or desired output for the associated training sample and may be referred to as the label for that training sample. In particular embodiments, the training may be performed using sequences of data so that a movement sequence serves as an additional signal that could help ML model 415 determine the ground truth for the sequence of data. As an example and not by way of limitation, the predicted ground truth should not be moving randomly, but should be more or less continuous.

In the inference phase, ML model 415 receives GPS data 610 measured by the client device and secondary information (e.g., environmental model data 615 and weather data 620). ML model 415 processes this input data (e.g., GPS data 610, environmental model data 615, weather data 620 etc.) and generates an output corresponding to an inferred ground truth. In particular embodiments, the output may be a vector offset from the input GPS data 610 that indicates the ground truth when GPS data 610 was measured, or absolute coordinates (e.g., longitude/latitude) of the ground truth, or an offset of the GPS data 610 (e.g., signal-strength). In particular embodiments, supervised training may be used to compare the output of ML model 415 with the known ground-truth location of the respective computing device using a location-comparison module 605 (e.g., a loss function). The ground-truth location is associated with training sample from which the output was computed. In particular embodiments, the output of location-comparison module 605 may be represented by the delta/difference or error between the output (e.g., the location offset needed to correct the measured GPS location) of ML model 415 and the ground truth. This error calculated by location-comparison module 605 is sent (e.g., via back propagation) to ML model 415, and through training, the value of the coefficients of ML model 415 (e.g., coefficients or parameter of the neurons) are iteratively updated to minimize the difference or error between the location inferred through GPS data 610 and the corresponding target output or labels.

Figure 7:
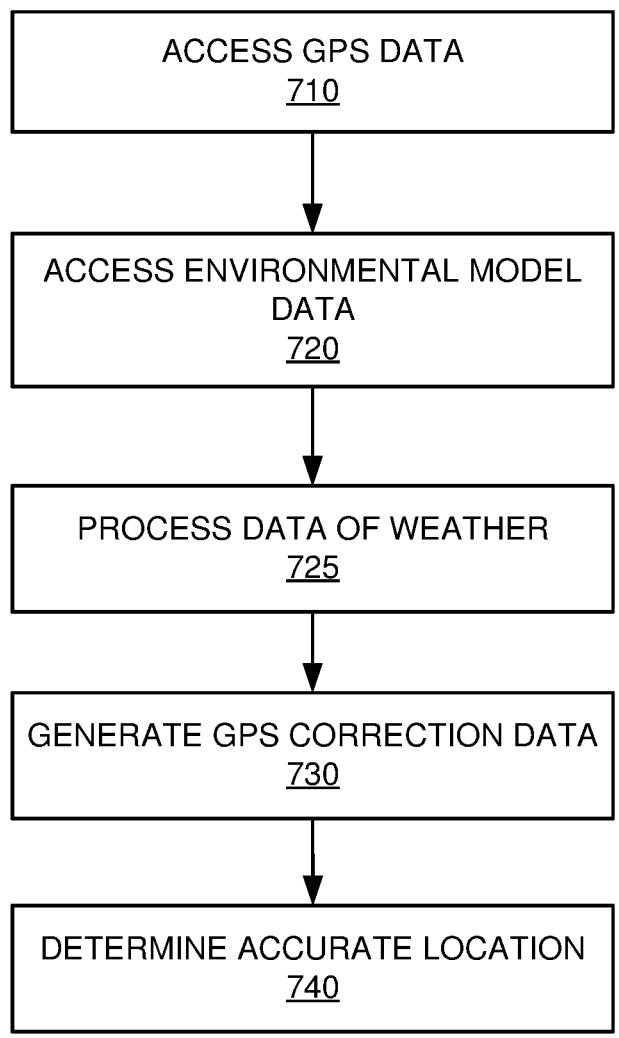
FIG. 7 illustrates an example method for correcting a GPS location.

FIG. 7 illustrates a method for correcting a GPS location. As described above, the ML model may be trained on a training data set with a sufficiently large number of training samples of measured GPS data with known target GPS data, as described with reference to FIG. 6. The method 700 may begin at step 710, where at inference time, a computing system may access global positioning system (GPS) data indicating a raw location associated with the computing system. As an example and not by way of limitation, the GPS data may include a signal strength of a signal received from each of a number of GPS satellites. For example, the GPS data may be provided by a pedestrian receiving navigation instructions to go to a particular destination (e.g., a restaurant) using a navigation app on a smartphone. As described in more detail above, the raw location may be a location indicated by uncorrected GPS data. At step, 720, the computing system may access, based on the raw location, environmental model data associated with one or more structures. As an example and not by way of limitation, the environmental model data includes three-dimensional geometry data of at least one of the one or more structures. In particular embodiments, the computing system may query a high-definition map using the GPS data for the structures in the vicinity of the raw location. In particular embodiments, number of structures for which data is accessed may be determined based on the 3D representation of the structures in the vicinity of the raw location. As an example and not by way of limitation, if the raw location is proximate to structures over 30 meters high, then only environmental model data of the immediate structures may be provided to the ML model. In the case where the preliminary location is proximate to structures less than 10 meters high, then environmental model data of structures within a predetermined radius (e.g., 200 meters) may be provided to the ML model.

In particular embodiments, at inference time, the computing system may access and process data of the weather based on the raw location and the timestamps of the GPS data, at step 725. As an example and not by way of limitation, weather data of the raw location may be retrieved from a weather reporting service/server. As another example, the weather data may be provided by the user indicating that it is raining, sunny, snowing, etc. at the raw location where the GPS data is collected. At step 730, the computing system may generate GPS correction data by processing the GPS data, environmental model data, weather data, and any other suitable secondary information using a machine-learning (ML) model. As described above, the ML model may receive and process the GPS data and the environmental model data to infer a correction to the received GPS data due to reflections of one or more structures as described with reference to FIG. 3. As an example and not by way of limitation, the GPS correction data may include signal strength offsets, longitudinal and latitudinal offsets, or a displacement vector from the raw location to a corrected location corresponding to the corrected GPS data. In particular embodiments, the ML model includes a neural network that includes a number of neurons and one or more computation modules configured to perform signal propagation computations, as described with reference to FIG. 5. At step 740, the computing system may determine an accurate location by correcting the raw location using the GPS correction data generated at step 730.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for correcting a GPS location including the particular steps of the method of FIG. 7, this disclosure contemplates any suitable method for correcting a GPS location including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
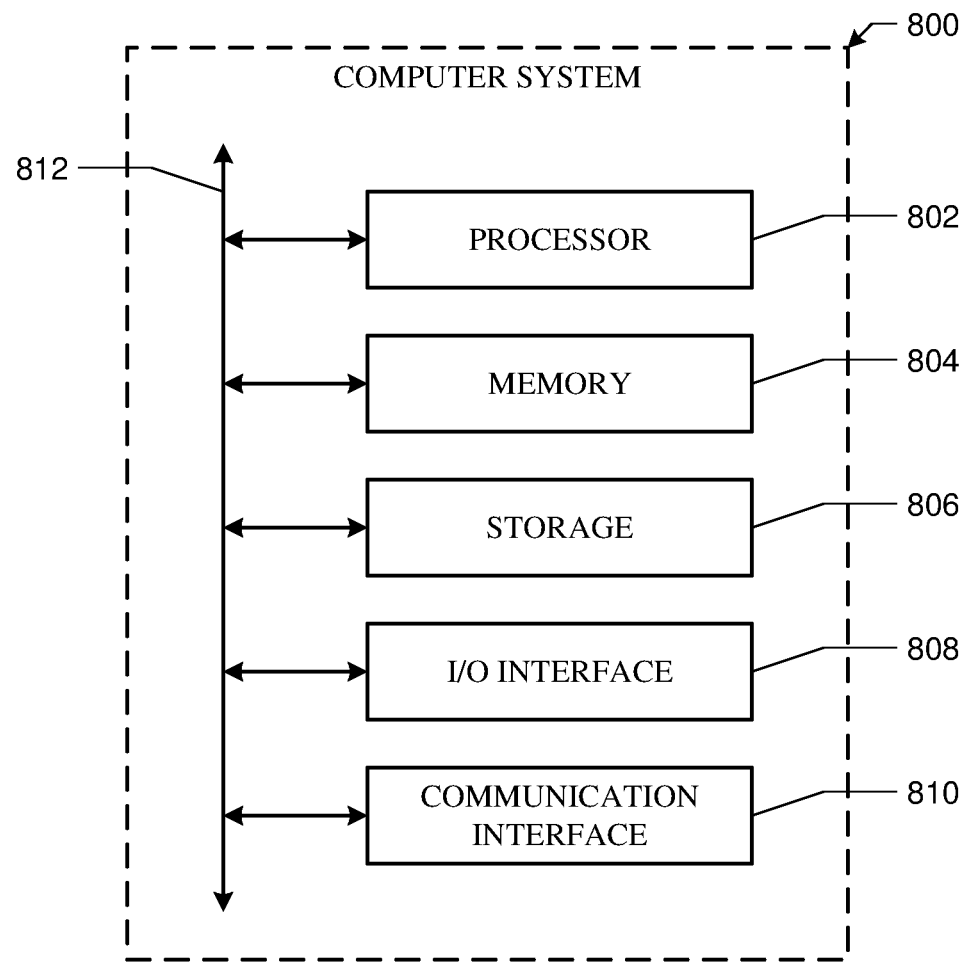
FIG. 8 illustrates an example of a computing system.

FIG. 8 illustrates an example computer system. In particular embodiments, one or more computer systems 800 perform one or more steps of one or more methods described or illustrated herein. In particular embodiments, one or more computer systems 800 provide the functionalities described or illustrated herein. In particular embodiments, software running on one or more computer systems 800 performs one or more steps of one or more methods described or illustrated herein or provides the functionalities described or illustrated herein. Particular embodiments include one or more portions of one or more computer systems 800. Herein, a reference to a computer system may encompass a computing device, and vice versa, where appropriate. Moreover, a reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 that are to be operated on by computer instructions; the results of previous instructions executed by processor 802 that are accessible to subsequent instructions or for writing to memory 804 or storage 806; or any other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs), be a multi-core processor, or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   accessing global positioning system (GPS) data indicating a raw location associated with a GPS receiver device, the raw location being an inaccurate location of the GPS receiver device;
   accessing, based on the raw location, environmental model data including one or more of building data or weather data;
   generating, using a machine learning (ML) model, GPS correction data to correct the inaccurate location of the GPS receiver device by processing the GPS data and the environmental model data, wherein the ML model is trained to compute a propagation of GPS signals due to environmental interference based on one or more of the building data or the weather data, and wherein the ML model uses the propagation of the GPS signals due to the environmental interference to compensate inaccurate GPS readings of the GPS receiver device; and
   determining an accurate location of the GPS receiver device by correcting the raw location using the GPS correction data generated by the ML model.

2. The method of claim 1, wherein accessing the environmental model data comprises querying a high-definition map using the GPS data.

3. The method of claim 1, wherein the building data comprises three-dimensional geometry data of at least one of one or more structures.

4. The method of claim 1, wherein the building data comprises building material information corresponding to at least one of one or more structures.

5. The method of claim 1, wherein the GPS correction data comprises one or more of signal strength offsets, longitudinal and latitudinal offsets, or a displacement vector from the raw location.

6. The method of claim 1, wherein the ML model comprises a neural network comprising a plurality of neurons and one or more computation modules configured to perform signal propagation computations.

7. The method of claim 1, wherein training the ML model comprises adjusting one or more weighting coefficients of the ML model based on a comparison of a plurality of measured GPS data with known target GPS data.

8. The method of claim 1, wherein training the ML model comprises adjusting one or more weighting coefficients of the ML model to compensate for the environmental interference based on the weather data associated with the raw location.

9. The method of claim 1, wherein training the ML model comprises adjusting one or more weighting coefficients of the ML model to compensate for the environmental interference based on the building data associated with the raw location.

10. The method of claim 1, further comprising normalizing the GPS data to rescale input values to the ML model prior to generating the GPS correction data.

11. The method of claim 1, wherein the GPS data is derived from measurements made by a GPS unit.

12. One or more computer-readable non-transitory storage media embodying software that is operable when executed to cause one or more processors to perform operations comprising:
    accessing global positioning system (GPS) data indicating a raw location associated with a GPS receiver device, the raw location being an inaccurate location of the GPS receiver device;
    accessing, based on the raw location, environmental model data including one or more of building data or weather data;
    generating, using a machine learning (ML) model, GPS correction data to correct the inaccurate location of the GPS receiver device by processing the GPS data and the environmental model data, wherein the ML model is trained to compute a propagation of GPS signals due to environmental interference based on one or more of the building data or the weather data, and wherein the ML model uses the propagation of the GPS signals due to the environmental interference to compensate inaccurate GPS readings of the GPS receiver device; and
    determining an accurate location of the GPS receiver device by correcting the raw location using the GPS correction data generated by the ML model.

13. The media of claim 12, wherein the software is further operable to query a high-definition map using the GPS data.

14. The media of claim 12, wherein the building data comprises three-dimensional geometry data of at least one of one or more structures.

15. The media of claim 12, wherein the building data comprises building material data of at least one of one or more structures.

16. The media of claim 12, wherein the GPS correction data comprises one or more of signal strength offsets, longitudinal and latitudinal offsets, or a displacement vector from the raw location.

17. A computing system comprising:
    one or more processors; and
    one or more computer-readable non-transitory storage media coupled to one or more of the processors, the one or more computer-readable non-transitory storage media comprising instructions operable when executed by one or more of the processors to cause the computing system to perform operations comprising:

accessing global positioning system (GPS) data indicating a raw location associated with a GPS receiver device, the raw location being an inaccurate location of the GPS receiver device;

accessing, based on the raw location, environmental model data including one or more of building data or weather data;

generating, using a machine learning (ML) model, GPS correction data to correct the inaccurate location of the GPS receiver device by processing the GPS data and the environmental model data, wherein the ML model is trained to compute a propagation of GPS signals due to environmental interference based on one or more of the building data or the weather data, and wherein the ML model uses the propagation of the GPS signals due to the environmental interference to compensate inaccurate GPS readings of the GPS receiver device; and determining an accurate location of the GPS receiver device by correcting the raw location using the GPS correction data generated by the ML model.

18. The system of claim 17, wherein the instructions are further operable to query a high-definition map using the GPS data.

19. The system of claim 17, wherein the building data comprises three-dimensional geometry data of at least one of one or more structures.

20. The system of claim 17, wherein the building data comprises building material data of at least one of one or more structures.

* * * * *